Patented Feb. 9, 1937

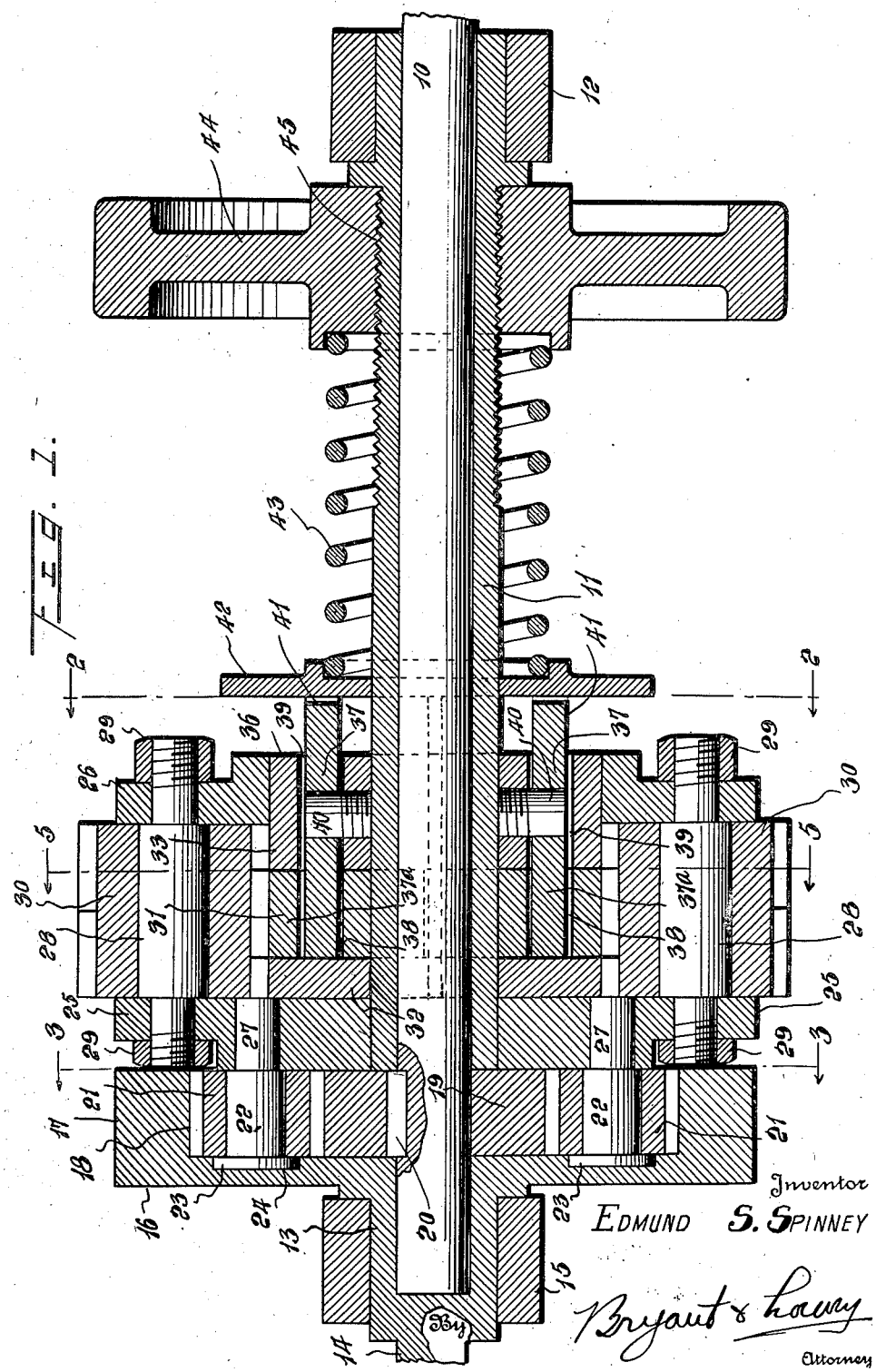

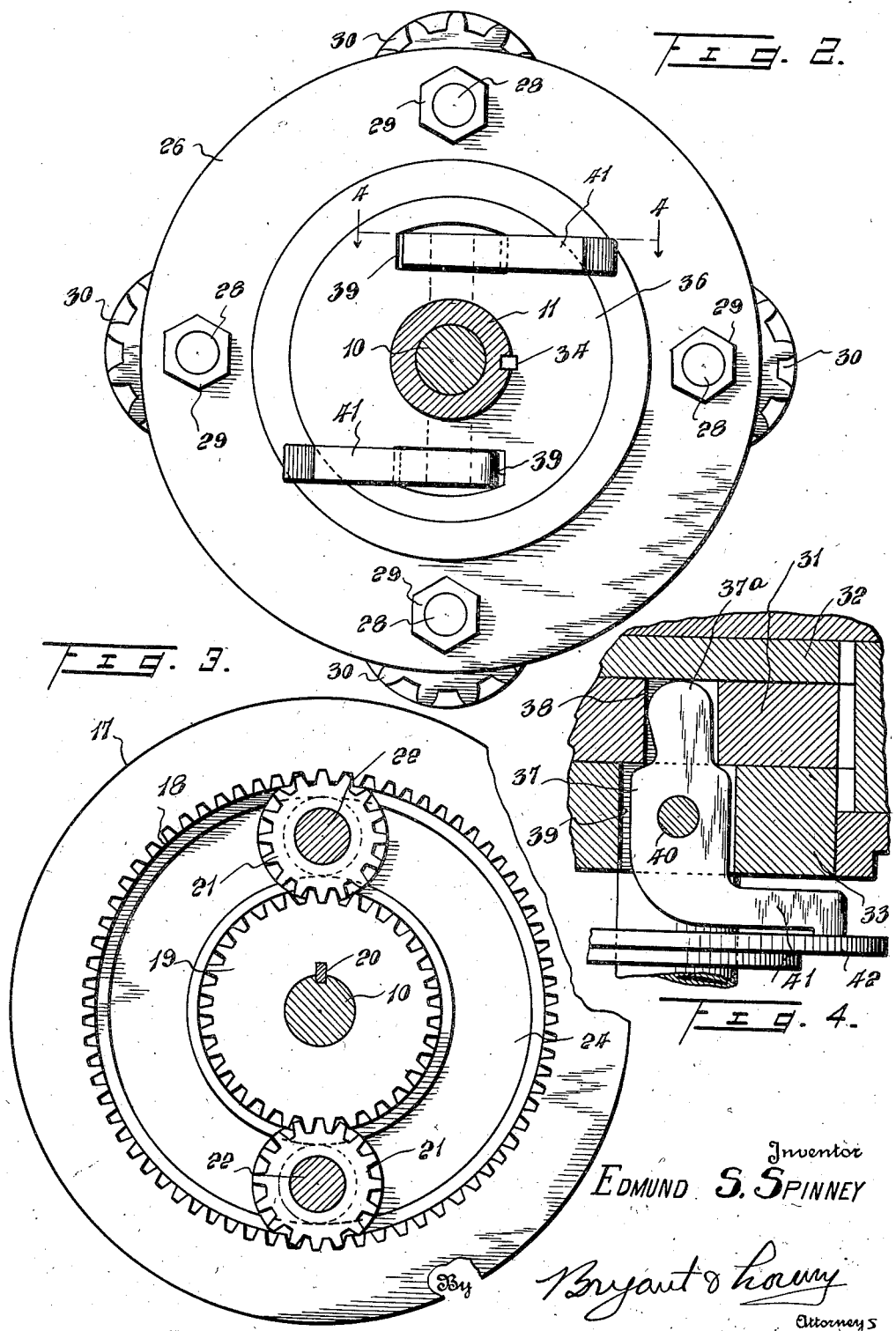

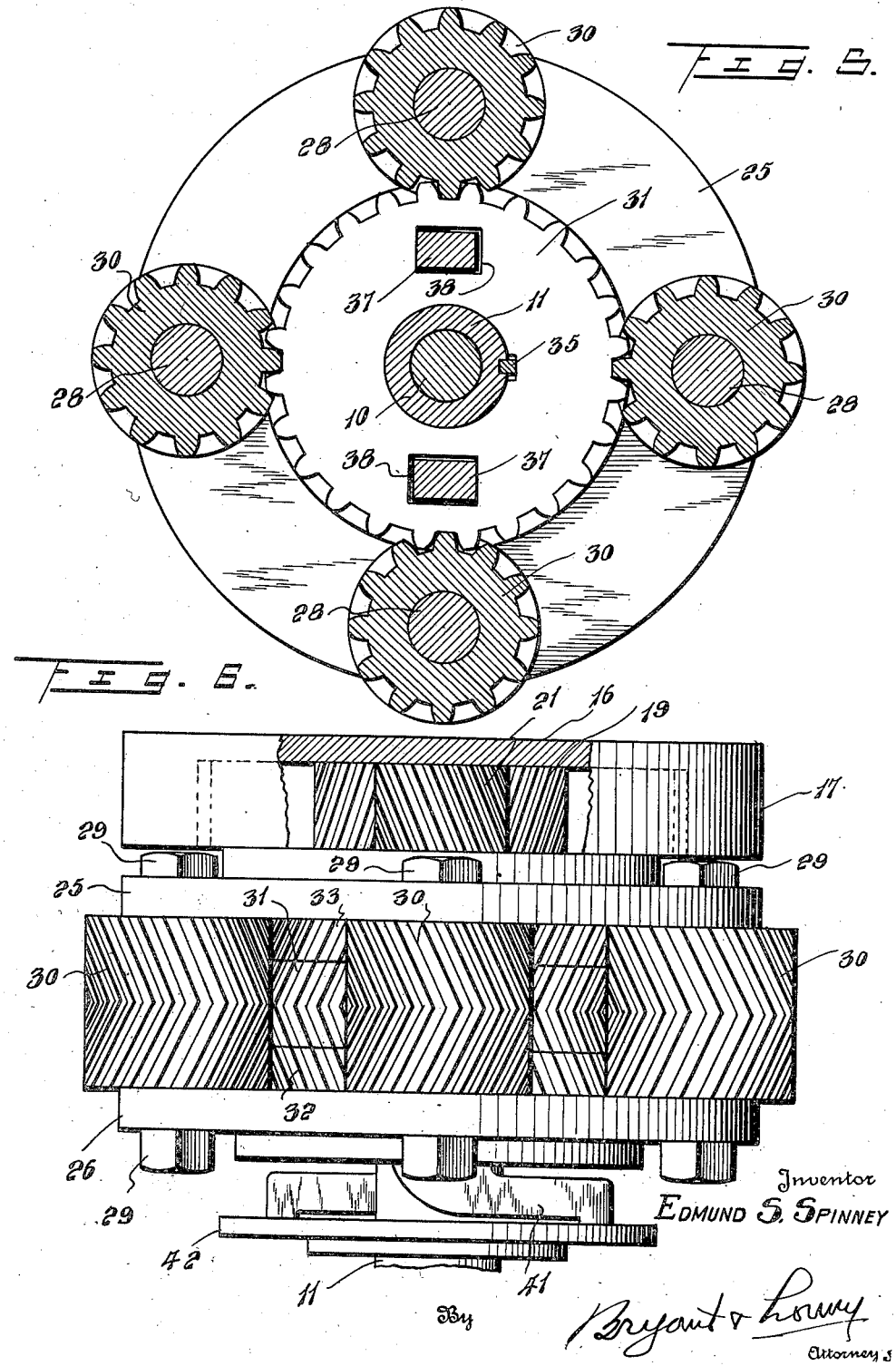

2,070,456

UNITED STATES PATENT OFFICE 2,070,456

TRANSMISSION MECHANISM

Edmund S. Spinney, Attleboro, Mass.

Application March 17, 1936, Serial No. 69,406

9 Claims. (Cl. 74—292)

This invention relates to certain new and useful improvements in transmission mechanism.

The primary object of the invention is to provide transmission mechanism wherein power may be transmitted from a drive to a driven member and of the type wherein the motion transmitted is continuous and uninterrupted, the transmission mechanism also being operative as a clutch for connecting the drive and driven members.

A further object of the invention is to provide transmission mechanism of the foregoing character including a continuous uninterrupted meshing gear train including a set of planetary gears with devices for effecting variable degrees of binding engagement between certain gears of the train to control operation of the planetary gears and to effect variable speeds of rotation of the driven shaft.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a vertical longitudinal sectional view of the transmission mechanism constructed in accordance with the present invention;

Figure 2 is a cross-sectional view taken on line 2—2 of Figure 1;

Figure 3 is a cross-sectional view taken on line 3—3 of Figure 1, showing the planetary gear section of the gear train;

Figure 4 is a detail sectional view taken on line 4—4 of Figure 2;

Figure 5 is a cross-sectional view taken on line 5—5 of Figure 1; and

Figure 6 is a fragmentary plan view, partly in section of the gear train of the transmission mechanism.

Referring more in detail to the accompanying drawings, the reference character 10 designates a drive shaft that is rotatably mounted in an elongated sleeve 11, one end of the sleeve being mounted in a support 12 against rotation. The end of the shaft 10 spaced from the support 12 is rotatable in a bearing 13 carried by the driven shaft 14, the bearing being rotatably mounted in a support 15.

Gear devices are interposed between the drive shaft 10 and driven shaft 14 for effecting the transmission of power at variable speeds and include a disk 16 carried by the inner end of the bearing 13 with an annular flange 17 at the peripheral edge of the disk that is internally toothed to provide an internal gear 18. A sun gear 19 is keyed at 20 to the shaft 10 within the internal gear 18 and is in meshing engagement with planetary gears 21 that in turn mesh with the internal gear 18, each planetary gear 21 being rotatably supported by a pin 22 that has a bearing in a cage member surrounding the drive shaft 10 laterally of the internal gear 18. The other end of the stub shaft 22 carries a disk head 23 that travels in a circular race 24.

The cage that supports the stub shaft 22 comprises a pair of side plates 25 and 26, the reduced ends 27 of the stub shaft 22 being mounted in the side plate 25 and said side plates 25 and 26 that are in spaced relation are connected together by cylindrical bearing bolts 28 having their opposite reduced ends passing through the side plates 25 and 26 and threaded for the reception of nuts 29. Planetary gears 30 of the herringbone type are journalled on the bolts 28 between the side plates 25 and 26 of the cage and travel around a stationary sun gear of the herringbone type that is formed of an intermediate section 31 and side sections 32 and 33. The sectional sun gear is mounted upon and keyed to the stationary sleeve 11, the outer sections being slidably keyed as shown at 34 in Figure 2, while the intermediate section 31 has a loose key connection as shown at 35 in Figure 5 so that the intermediate section 31 of the sectional sun gear may be rotatably shifted relative to the side sections 32 and 33, for purposes presently to appear. The rotatable mounting of the cage is accommodated by the bearing of the side plate 25 on the sleeve 11 while an annular flange 36 that projects laterally of the sun gear section 33 constitutes a bearing for the side plate 26 of the cage.

Means is provided for rotatably shifting the intermediate section 31 of the sectional sun gear in the cage to cause a binding action between said sectional sun gear and the planetary gears 30 associated therewith for retarding and holding the cage from rotary movement and includes a pair of bell crank levers respectively arranged at opposite sides of the drive shaft 10 and associated with the intermediate sun gear section 31 and side section 33, one leg 37 of the lever extending into registering openings 38 and 39 formed in the gear sections 31 and 33 as shown in Figure 4 and being pivotally mounted upon a screw pin 40 within the gear section 33. The other leg 41 of the bell crank lever extends in a direction transversely of the longitudinal axis of the drive shaft 10 and is adapted to be operated for pivotally moving the lever to move the inner end 37a of the leg 37 that extends into the opening in the intermediate gear section 31 to cause a slight rotary movement of said gear section. A disk 42 is slidably mounted upon the sleeve 11 and is engaged with the legs 41 of the bell crank levers as shown in Figures 1 and 4, the engagement being maintained by a coil spring 43 surrounding the sleeve 11 with one end of the spring engaged with the disk 42 and the other end of the spring engaged with a hand wheel 44 that is threaded onto the sleeve 11 as at 45. It will be noted that when the hand wheel 44 is threaded over the sleeve 11, the spring 43 is compressed and power thereof exerted upon the disk 42 to move the bell crank levers upon their pivots 40, to effect the desired degree of rotary shifting movement of the intermediate section 31 of the sectional sun gear within the cage. It is to be understood that other forms of operating means for the bell crank levers may be provided.

When the teeth of the three sectioned sun gear within the cage are properly aligned, the planetary gears 30 mesh therewith in the usual manner so that when the drive shaft 10 is rotated, the sun gear 19 fixed thereto causes rotation of the planetary gears 21 with the latter moving around the sun gear 19 and imparting a rotary movement to the cage, normal resistance to rotation of the driven shaft 14 holding the internal gear 18 against rotary movement. To effect rotation of the driven shaft 14, the bell crank levers are shifted by means of the hand wheel 44, spring 43 and disk 42 to effect rotary movement of the intermediate section 31 of the sectional sun gear within the cage relative to the lateral gear sections 32 and 33, this movement causing a binding or wedging engagement between the sectional sun gear and planetary gears 30 meshing therewith, this wedging action acting as a brake to rotation of the cage for holding the stub shaft 22 from movement in a circular path with the result that rotation of the drive shaft 10 is directly communicated to the internal gear 18 through the gears 21 and to the driven shaft 14. The speed of rotation of the driven shaft 14 relative to the speed of rotation of the drive shaft 10 is variable by the degree of wedging action between the sectional sun gear and planetary gears 30 in the cage.

As shown in Figure 6, the sun gear 19, the planetary gears 21 and the internal gear 18 have spiral or helically cut teeth that may range from angles of 22 to 45 degrees so that in the event of a sudden overload on the driven shaft 14, there will be an end thrust or sliding motion of the planetary gears 21 together with the cage that houses the sectional sun gear toward the disk 42 for further compression of the spring 43 resulting in increased binding action between the sectional sun gear within the cage and the planetary gears 30. The planetary gears 21 associated with the sun gear 19 and internal gear 18 are rotatable on the shafts 22 that have their ends 27 anchored in the side wall 25 of the cage, so that thrust movements of the planetary gears 21 are imparted to the cage for further operation of the bell crank levers as will at once be understood from an inspection of Figures 1 and 4. The keys 34 are carried by the sectional sun gear and are movable in the groove or spline in the sleeve 11 so that the wall 25 of the cage is free to slide on the sleeve 11 in response to end thrust movements.

From the above detailed description of the invention, it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim:—

1. Transmission mechanism comprising alined drive and driven shafts, variable speed gear devices between the shafts including a planetary gear train adapted for direct driving connection between the shafts and normally inoperative to effect the transmission of power from the drive to the driven shaft, and a second planetary gear train associated with the aforesaid train and embodying means adapted to be operated for rendering the first gear train operative for the transmission of power, said means including a three-part sun gear of the second gear train and means for rotatably moving the intermediate part relative to the other parts to effect binding action between the three-part sun gear and planetary gears for holding the second planetary gear train against rotation.

2. Transmission mechanism comprising alined drive and driven shafts, variable speed gear devices between the shafts including a planetary gear train adapted for direct driving connection between the shafts and normally inoperative to effect the transmission of power from the drive to the driven shaft, and a second planetary gear train associated with the aforesaid train and embodying means adapted to be operated for rendering the first gear train operative for the transmission of power, the planetary gears of the first train being movable with the planetary gears of the second train, said means including a three-part sun gear of the second gear train and means for rotatably moving the intermediate part relative to the other parts to effect binding action between the three-part sun gear and planetary gears for holding the second planetary gear train against rotation.

3. Transmission mechanism comprising alined drive and driven shafts, variable speed gear devices between the shafts including a planetary gear train adapted for direct driving connection between the shafts and normally inoperative to effect the transmission of power from the drive to the driven shaft, and a second planetary gear train associated with the aforesaid train and embodying means adapted to be operated for rendering the first gear train operative for the transmission of power, a cage for the second gear train rotatable on the drive shaft and spaced from the adjacent end of the driven shaft and stub shafts carried by the cage for the support of the planetary gears of the first gear train, said means including a three-part sun gear of the second gear train and means for rotatably moving the intermediate part relative to the other parts to effect binding action between the three-part sun gear and planetary gears for holding the second planetary gear train against rotation.

4. Transmission mechanism comprising alined drive and driven shafts, variable speed gear devices between the shafts including a planetary gear train adapted for direct driving connection between the shafts and normally inoperative to effect the transmission of power from the drive to the driven shaft, and a second planetary gear train associated with the aforesaid train and embodying means adapted to be operated for rendering the first gear train operative for the transmission of power, said means including a sectional sun gear of the second gear train and means for moving one section relative to the other sections to effect binding action between the sectional sun gear and planetary gears for holding the second planetary gear train against rotation, including a pair of bell crank levers each having a leg engaged with the movable section of the sectional sun gear, and manually operable means for operating the bell crank levers.

5. Transmission mechanism comprising alined drive and driven shafts, variable speed gear devices between the shafts including a planetary gear train adapted for direct driving connection between the shafts and normally inoperative to effect the transmission of power from the drive to the driven shaft, and a second planetary gear train associated with the aforesaid train and embodying means adapted to be operated for rendering the first gear train operative for the transmission of power, the planetary gears of the first train being movable with the planetary gears of the second train, said means including a sectional sun gear of the second gear train and means for moving one section relative to the other sections to effect binding action between the sectional sun gear and planetary gears for holding the second planetary gear train against rotation, including a pair of bell crank levers each having a leg engaged with the movable section of the sectional sun gear and manually operable means for operating the bell crank levers.

6. Transmission mechanism comprising alined drive and driven shafts, variable speed gear devices between the shafts including a planetary gear train adapted for direct driving connection between the shafts and normally inoperative to effect the transmission of power from the drive to the driven shaft, and a second planetary gear train associated with the aforesaid train and embodying means adapted to be operated for rendering the first gear train operative for the transmission of power, a cage for the second gear train rotatable on the drive shaft and stub shafts carried by the cage for the support of the planetary gears of the first gear train, said means including a sectional sun gear of the second gear train and means for moving one section relative to the other sections to effect binding action between the sectional sun gear and planetary gears for holding the second planetary gear train against rotation, including a pair of bell crank levers each having a leg engaged with the movable section of the sectional sun gear, and manually operable means for operating the bell crank levers.

7. Transmission mechanism comprising alined drive and driven shafts, variable speed gear devices between the shafts including a planetary gear train adapted for direct driving connection between the shafts and normally inoperative to effect the transmission of power from the drive to the driven shaft, and a second planetary gear train associated with the aforesaid train and embodying means adapted to be operated for rendering the first gear train operative for the transmission of power, a cage for the second gear train rotatable on the drive shaft and stub shafts carried by the cage for the support of the planetary gears of the first gear train, the gears of the first planetary gear train being of the helical type whereby an overload on the driven shaft causes the planetary gears to shift relatively to the sun gear and move the cage and planetary gears carried thereby towards the operating means for the first gear train for rendering the drive connection between the drive and driven shafts more positive.

8. Transmission mechanism comprising alined drive and driven shafts, variable speed gear devices between the shafts including a planetary gear train adapted for direct driving connection between the shafts and normally inoperative to effect the transmission of power from the drive to the driven shaft, and a second planetary gear train associated with the aforesaid train and embodying means adapted to be operated for rendering the first gear train operative for the transmission of power, a cage for the second gear train rotatable on the drive shaft and stub shafts carried by the cage for the support of the planetary gears of the first gear train, said means including a sectional sun gear of the second gear train and means for moving one section relative to the other sections to effect binding action between the sectional sun gear and planetary gears for holding the second planetary gear train against rotation, the gears of the first planetary gear train being of the helical type whereby an overload on the driven shaft causes the planetary gears to shift relatively to the sun gear and move the cage and planetary gears carried thereby towards the operating means for the first gear train for rendering the drive connection between the drive and driven shafts more positive.

9. Transmission mechanism comprising alined drive and driven shafts, variable speed gear devices between the shafts including a planetary gear train adapted for direct driving connection between the shafts and normally inoperative to effect the transmission of power from the drive to the driven shaft, and a second planetary gear train associated with the aforesaid train and embodying means adapted to be operated for rendering the first gear train operative for the transmission of power, a cage for the second gear train rotatable on the drive shaft and stub shafts carried by the cage for the support of the planetary gears of the first gear train, said means including a sectional sun gear of the second gear train and means for moving one section relative to the other sections to effect binding action between the sectional sun gear and planetary gears for holding the second planetary gear train against rotation, including a pair of bell crank levers each having a leg engaged with the movable section of the sectional sun gear, and manually operable means for operating the bell crank levers, the gears of the first planetary gear train being of the helical type whereby an overload on the driven shaft causes the planetary gears to shift relatively to the sun gear and move the cage and planetary gears carried thereby towards the operating means for the first gear train for rendering the drive connection between the drive and driven shafts more positive.

EDMUND S. SPINNEY.